United States Patent
Li

(10) Patent No.: US 11,140,008 B2
(45) Date of Patent: Oct. 5, 2021

(54) NOISE COMPENSATION FOR COMMUNICATION ON POWER LINE DOWNHOLE

(71) Applicant: Halliburton Energy Services, Inc., Houston, TX (US)

(72) Inventor: Peng Li, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 581 days.

(21) Appl. No.: 16/087,165

(22) PCT Filed: Dec. 7, 2017

(86) PCT No.: PCT/US2017/065098
§ 371 (c)(1),
(2) Date: Sep. 21, 2018

(87) PCT Pub. No.: WO2019/112589
PCT Pub. Date: Jun. 13, 2019

(65) Prior Publication Data
US 2021/0234734 A1 Jul. 29, 2021

(51) Int. Cl.
*H04B 3/54* (2006.01)
*H04L 27/00* (2006.01)

(52) U.S. Cl.
CPC ......... *H04L 27/0002* (2013.01); *H04B 3/542* (2013.01); *H04B 3/548* (2013.01); *H04B 2203/547* (2013.01); *H04B 2203/5475* (2013.01)

(58) Field of Classification Search
CPC .......... H04B 3/54; H04B 3/542; H04B 3/548; H04B 2203/547; H04B 2203/5475; H04L 27/0002
See application file for complete search history.

(56) References Cited

U.S. PATENT DOCUMENTS 4,665,531 A 5/1987 Aly
6,407,987 B1 6/2002 Abraham
(Continued)

FOREIGN PATENT DOCUMENTS

JP 2016502789 6/2016
WO 2015042355 3/2015

OTHER PUBLICATIONS

International Patent Application No. PCT/US2017/065098, International Search Report and Written Opinion, dated Aug. 30, 2018, 21 pages.

*Primary Examiner* — Blane J Jackson
(74) *Attorney, Agent, or Firm* — Kilpatrick Townsend & Stockton LLP

(57) ABSTRACT

A communication system can include a first transceiver device and a second transceiver device that can communicate digital baseband data via a direct current (DC) power line bus in the wellbore. One or more of the transceivers includes a coupler for the DC power line bus for transceiving data via the DC power line bus with the other transceiver device, modulation circuitry, demodulation circuitry, and compensator circuitry. The compensator circuitry can be communicatively coupled to the coupler for providing an operating point to the coupler in response to both the modulation circuitry and the demodulation circuitry being in an idle state, to reduce effects of low frequency drift and noise in signals.

20 Claims, 3 Drawing Sheets

(56) References Cited

U.S. PATENT DOCUMENTS

| | | | |
|---|---|---|---|
| 8,692,685 B2* | 4/2014 | Estevez | H04L 67/12 |
| | | | 340/853.1 |
| 9,064,388 B1 | 6/2015 | Razazian et al. | |
| 9,982,528 B2* | 5/2018 | Recio | H04Q 9/00 |
| 10,082,942 B2* | 9/2018 | Jarrot | E21B 47/13 |
| 2005/0169363 A1 | 8/2005 | Logvinov et al. | |
| 2010/0194587 A1* | 8/2010 | Weerasinghe | G01V 11/00 |
| | | | 340/854.9 |
| 2012/0037354 A1 | 2/2012 | Mccoy et al. | |
| 2014/0152457 A1* | 6/2014 | Nishisaka | H04B 3/46 |
| | | | 340/853.2 |
| 2014/0355697 A1 | 12/2014 | Magin et al. | |
| 2015/0229358 A1 | 8/2015 | Vrazic | |
| 2015/0270910 A1 | 9/2015 | Bernstein et al. | |
| 2017/0260851 A1* | 9/2017 | Rendusara | F04D 13/10 |
| 2018/0248584 A1* | 8/2018 | Nguyen | H04B 3/54 |
| 2018/0313208 A1* | 11/2018 | Pietryka | H04B 3/54 |
| 2020/0291769 A1* | 9/2020 | Torbett | H04B 1/1027 |

* cited by examiner

NOISE COMPENSATION FOR COMMUNICATION ON POWER LINE DOWNHOLE

TECHNICAL FIELD

The present disclosure relates generally to devices for use in wellbores. More specifically, but not by way of limitation, this disclosure relates to methods and systems for communicating data between devices downhole in a wellbore.

BACKGROUND

A well (e.g., an oil or gas well for extracting fluid or gas from a subterranean formation) can include various tools, such as sensors and functional devices. The tools may communicate with each other and devices at the surface of the wellbore through transceivers and a communication medium. For example, a well system can include sensors for measuring well system parameters, such as temperature, pressure, resistivity, or sound levels. One sensor can transmit data to another sensor, which can transmit the data to a well operator device at the surface. In a downhole environment, there is a harsh conditions (e.g., high temperature) and space constraints, among other characteristics, which can introduce noise, low frequency drives, and otherwise negatively impact the signals carrying data between devices downhole.

DETAILED DESCRIPTION

Certain aspects and features of the present disclosure relate to a downhole communication system that can use a direct current (DC) power line bus as a communication medium transmitting digital baseband data between devices that can compensate for noise, frequency drifts, and other effects on signals in the downhole environment. One or more of the devices can include compensator circuitry that drive a coupler between the respective device and the DC power line bus at an operating point to compensate for noise or other issues in the signal. By compensating for noise and other signal issues, the speed and reliability of a downhole DC power line bus communication system can be improved. For example, data can be transferred at a faster rate than otherwise because noise introduced into the signals can be compensated at a receiving device.

A power line communication system according to some examples can use electrical wiring to simultaneously carry both data and electric power. To achieve this, a coupling media is used to couple the changing digital signals onto the power line while blocking power from the power line from impacting the communication circuitry. Signals can be encoded, such as by being bipolar encoded that is a return to zero (RZ) line coding scheme designed to be DC balanced, where two nonzero values (positive and negative) are used in addition to the zero value, so that the three values are positive, negative, and zero. The positive signal and the negative signal modulated on the bus can have equivalent energy over time and the average value on the power line bus can be the DC supply voltage. Bipolar encoding can be simple and easy to implement. But bipolar encoding can be susceptible to the low frequency drifts and noise problems that limit the data speed and performance in power line communication (PLC) applications.

In some examples, low frequency drift and noise in a coupler can be corrected, such as corrected noises of a bipolar encoding circuit, to boost the speed and robustness of the PLC system. For example, compensator circuitry can be included on top of modulation and demodulation modules to hold the operating point of the transceiver circuit. When there is communication idling, the compensator circuitry can be enabled and drive the coupler to its normal point.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
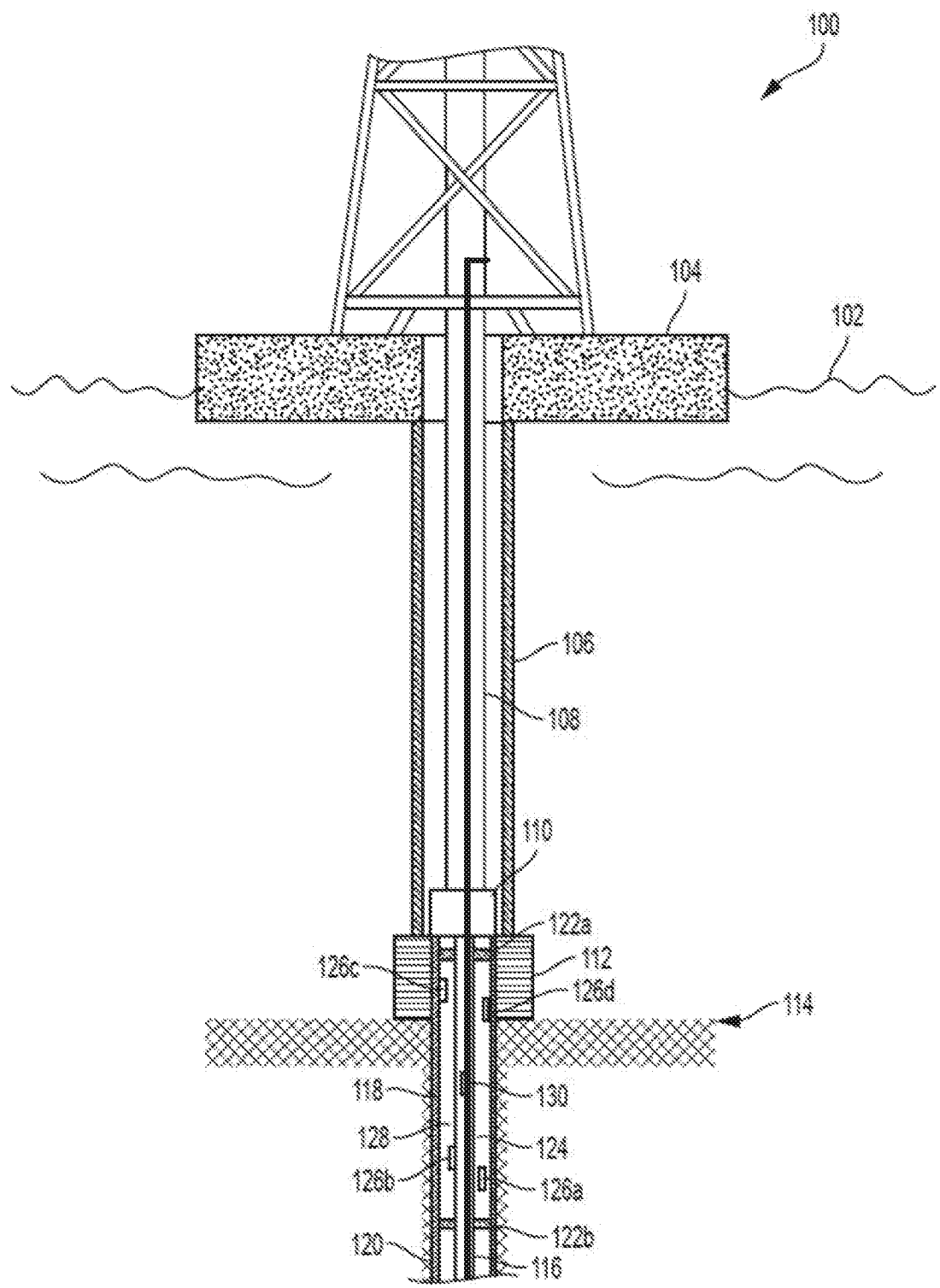
FIG. 1 is a cross-sectional view of an example of a well system that can include a communication system in a downhole environment for transceiving digital baseband signals via a power line bus according to some aspects.

FIG. 1 is a cross-sectional view of an example of a well system 100 that can include a communication system in a downhole environment for transceiving digital baseband signals via a power line bus according to some aspects. The well system 100 includes a platform 104. In some examples, the platform 104 can be a floating rig or a vessel positioned at the sea surface 102. A riser 106 can extend from the platform 104 to a subsea tree 112. The subsea tree 112 can be positioned at the sea floor 114. The riser 106 can include a tubular 108 (e.g., a landing string). The tubular 108 can extend from the platform 104 to the subsea tree 112. In some examples, a well operator can use the tubular 108 to communicate fluid, power, well tools, and other well components between the sea surface 102 and the sea floor 114.

The subsea tree 112 can include ports, valves, and flow lines for controlling fluid flow through the well system 100. In some examples, the subsea tree 112 can control the flow of fluid through a tubular 116 (e.g., a production tube) positioned in a wellbore 120 (e.g., below the sea floor 114). The tubular 116 can be positioned in the wellbore 120 for extracting hydrocarbons from the wellbore 120. In other examples, the subsea tree 112 can control the flow of fluid from the tubular 116 to other well tools in the well system 100. For example, the subsea tree 112 can control the flow of fluid from the tubular 116 to other well tools positioned on the sea floor 114. In some examples, the subsea tree 112 can include or otherwise be coupled to a subsea control system 110 for controlling the subsea tree 112.

The wellbore 120 can include a casing string 118. The casing string 118 can be positioned in the wellbore 120 for preventing the walls of the wellbore 120 from collapsing.

In some examples, multiple transceivers 126a-d can be randomly, sequentially, or otherwise positioned in a space 124 between an outer housing of the tubular 116 and an inner housing of the casing string 118. The transceivers 126a-d can communicate data (e.g., sensor data) among one another via a power line bus 130 that extends through the length of the well system 100 to provide power from a power source (not shown) to components, include the transceivers 126a-d, in the wellbore.

The transceivers 126a-d can be coupled to the tubular 116, to the casing string 118, or both. In some examples, each of the transceivers 126a-d can include one or more sensors. The sensor can detect a characteristic of a transceiver 126a-d, a characteristic of a well tool, a characteristic an environment in a wellbore, or any combination of these. Examples of the sensors can include a temperature sensor, pressure sensor, vibration sensor, acoustic sensor (e.g., a microphone), strain gauge, flow sensor, tilt sensor, accelerometer, gyroscope, inclinometer, or any combination of these. Each of the transceivers 126a-d can gather data (e.g., in real time) via a respective sensor and transmit the data to another transceiver 126a-d. In other examples, the transceivers 126a-d are associated with tools and exchange data for controlling the tools. One of the transceivers 126a-d may be a master transceiver that communicates via any suitable form or protocol with components at the surface of the well system 100. The other transceivers 126a-d may be slave transceivers that form a mesh network for conveying data and information from one transceiver to the master transceiver for retransmission to the surface component.

Although depicted and described as a subsea well system 100, in other examples the well system is a terrestrial well system that can take multiple forms. In addition, the distances between each of the transceivers 126a-d may be significantly larger than that which is represented in FIG. 1. That is, FIG. 1 is not drawn to scale.

Figure 2:
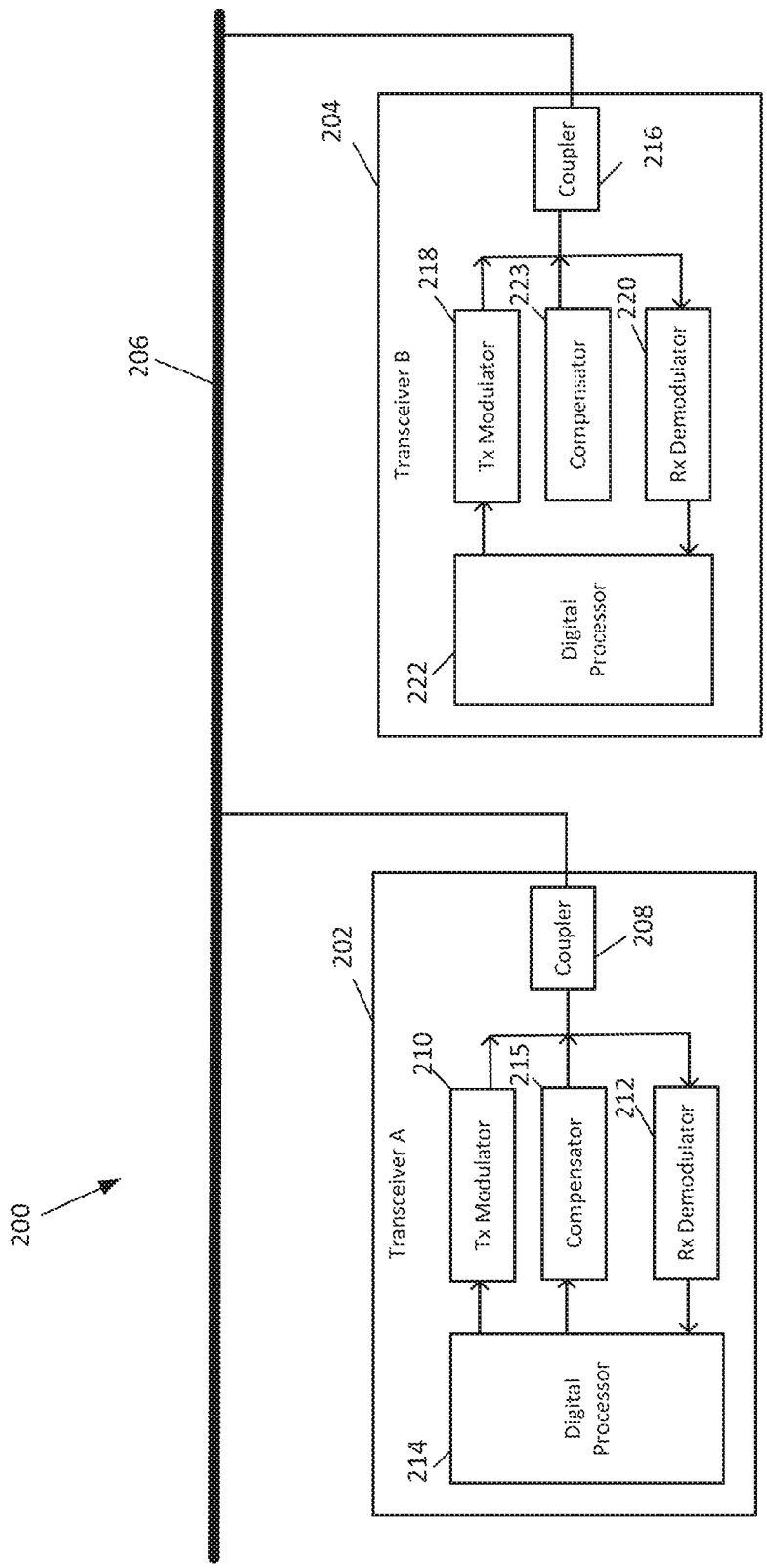
FIG. 2 is a schematic block diagram of a communication system that can be used to communicate among devices downhole in a wellbore according to some aspects.

FIG. 2 is a schematic block diagram of a communication system 200 that can be used to communicate among devices downhole in a wellbore according to one example. The communication system 200 can be used to communicate digital baseband data between transceivers 202, 204 via a power line bus 206 in the wellbore. The power line bus 206 can be a DC power line bus that includes a pair of wires that can carry power for tools in the wellbore, but that can also carry digital baseband data.

Included in transceiver A 202 is a coupler 208, a transmit modulator 210, a receive demodulator 212, a digital processor 214, and a compensator 215. Transceiver B 204 can include similar elements, such as a coupler 216, transmit modulator 218, receive demodulator 220, digital processor 222, and compensator 223. In other examples, transceiver A 202 or transceiver B 204 can include different types of components as compared to the other transceiver.

The couplers 208, 216 can couple the transceivers 202, 204 to the power line bus 206 for receiving and transmitting digital baseband data via the power line bus 206, while isolating the transceivers from power on the power line bus 206. Examples of the couplers 208, 216 include capacitive couplers and inductive couplers. Under normal operating conditions, the couplers 208, 216 can behave as an open and block the power line voltages from the transceivers, and behave as a short for high frequency digital signals.

The transmit modulators 210, 218 include circuitry that can modulate data from the digital processors 214, 222 into digital baseband data form for transmission via the couplers 208, 216 to the power line bus 206. The receive demodulators 212, 220 include circuitry that can receive digital baseband data from the power line bus 206 via the couplers 208, 216 and demodulate the digital baseband data.

The receive demodulators 212, 220 can demodulate the digital baseband data into digital data streams that are provided to the digital processors 214, 222. The digital processors 214, 222 can filter the digital data streams and apply error correction to the digital data streams, to produce a decoded digital data stream. Examples of the digital processors 214, 222 include FPGAs. The decoded digital data stream can be used by the digital processors 214, 222 to control a tool or provide the data to another device. The digital processors 214, 222 can also encode data and control the transmit modulators 210, 218 to generate modulated signals.

When in an idle state in which there is no communication, the power line bus 206 can hold the DC bus voltages and no transits occur on the power line bus 206. The transceivers 202, 204 can decode the bus states as zero. When one or more of the transceivers 202, 204 are transmitting, the respective digital processor 214, 222 can modulate the bipolar positive and negative signals on the power line bus 206. The bus 206 can have the positive and negative transits on top of the DC power voltages. With the couplers 208, 216 blocking the DC part of the voltages, the transceivers 202, 204 can see only the positive and negative changes and can decode the received signals. The communication scheme can work smoothly as long as the bus voltages are maintained and no extra transits (beyond the modulated positive and negative signals) appear on the power line bus 206.

Since the power line bus 206 carries both communication signals and power, it can be difficult to predict the bus transits. And, for most cases, there can be unavoidable low-frequency transits and noise that can occur on the power line bus 206, which can affect the communication signals. Moreover, although the bipolar encoding ensures the DC balanced encoding from a protocol level, it can be impossible for the transceivers 202, 204 (when transmitting) to generate 100% symmetrical positive and negative modulations physically. For communications with very small bus idle states, the unmatched positive and negative parts can accumulate over time and lead to communication errors. When low frequency transients occur on the bus 206, the couplers 208, 216 may no longer behave as an open. And some of the low frequency transients may pass through the couplers 208, 216 and slowly move the operating point of the transceivers 202, 204. The operating point can be a preset level of voltage or charge. Moving the operating point can affect the visibility of the positive and negative signals received by the transceivers 202, 204. And, once outside its normal range, the receiver may wrongly decode the positive and negative signals, and thus communication errors can occur. The transceivers 202, 204 can slow down and wait for the transient to finish and return to point operations. This can greatly limit the robustness and the speed of communication within the system.

The compensators 215, 223 can include circuitry that can overcome this problem by holding the operating point of the transceivers 202, 204. When there is communication idling, the compensators 215, 223 can be enabled and drive the couplers 208, 216 to normal operating points.

Figure 3:
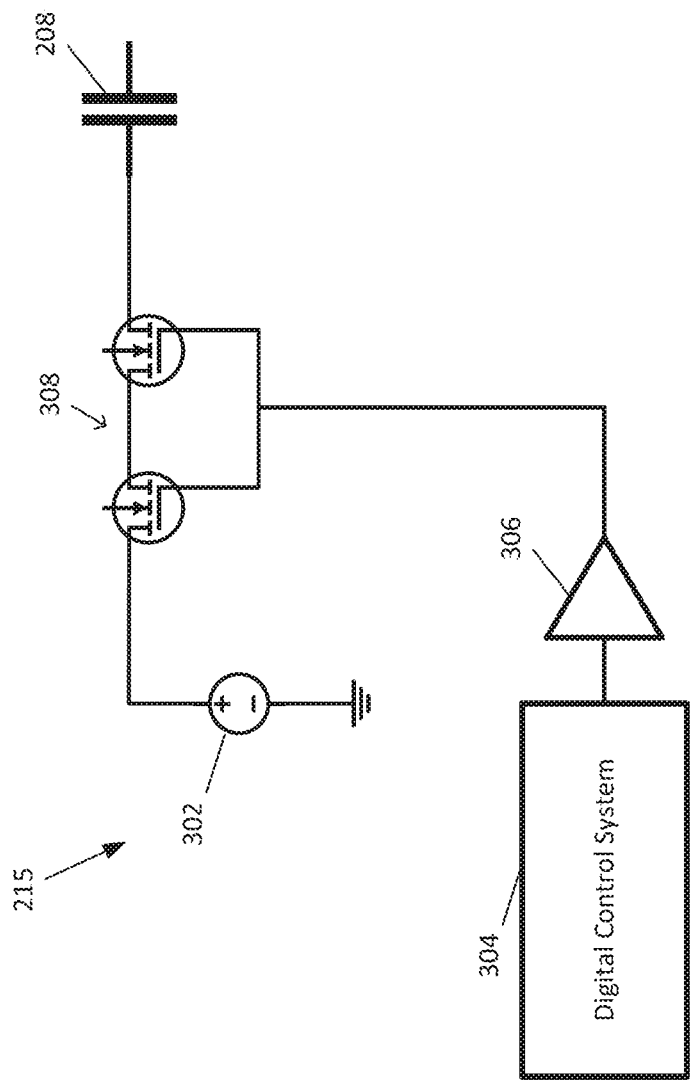
FIG. 3 is a schematic diagram of a compensator according to some aspects.

FIG. 3 is a schematic diagram of the compensator 215 from FIG. 2 according to one example. Compensator 223 from FIG. 2 may be similarly constructed. In FIG. 3, there is a voltage source 302 communicatively coupled to a transistor network 308, which is communicatively coupled to the coupler 208 that, in FIG. 3, is a capacitive coupler. A digital control system 304 is communicatively coupled to the transistor network 308 via a gate driver 306. The digital control system 304 may be part of the digital processor 214 from FIG. 2, or the digital control system 304 can be a separate component from the digital processor 214. The transistor network 308 in FIG. 3 includes a pair of MOSFET transistors, but other configurations are also possible. For example, more than two transistors can be used, and other types of transistors may be used.

The transistors of the transistor network 308 can be normally off and in a block state. In the block state, the transistors can block current and isolate the compensator 215 from the rest of the transceiver and can have no effect on the power line bus.

The digital control system 304 can detect that the transceiver is in an idle state. For example, the digital control system 304 can monitor the activity of the transmit modulator 210 and the receive demodulator 212, from FIG. 2, and determine that the transceiver is neither modulating nor demodulating signals. In other examples, the digital control system 304 can receive indications from the transmit modulator 210 and the receive demodulator 212 as to the operating states of those components, or the digital control system 304 can monitor activity on the power line bus to detect an idle state. In response to detecting that the transceiver is in an idle state, the digital control system 304 can output an enable signal to drive the gate driver 306 and turn on the transistors of the transistor network 308 so that the transistor network is in a pass state. With transistors turned on, the voltage, which can be set at an operating point voltage, from the voltage source 302, which can be a reference voltage source, can be engaged and provided to the coupler 208 to provide compensation to the coupler 208. An example of the level of the voltage form the voltage source 302 is 3.3 V. The voltage can prevent bus transits from passing and pull the coupler 208 to its normal operating point. With compensation injected onto the bus from time to time, low frequency drifts and noise can be corrected before the accumulation effect occurs.

Compensation can occur in both an active manner and a passive manner. In active compensation, the digital control system 304 can actively monitor the power line states to detect a communication idle state and, once detected, quickly inject compensation and institute a waiting period until the next compensation occurs. In passive compensation, compensation can be included in communication protocols and be caused to occur at known times, when there is known communication idling periods. For example, the compensation can occur just after a data transfer transaction.

By compensating for low frequency drifts and noise, through providing operating point voltages to couplers from time to time, downhole power line communication systems can operate at higher speeds and with greater robustness.

In some aspects, systems are methods for digital baseband communications over power line in a downhole environment are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a transceiver device comprising: a coupler for a direct current (DC) power line bus for transceiving data via the DC power line bus; modulation circuitry; demodulation circuitry; and compensator circuitry communicatively coupled to the coupler for providing an operating point to the coupler in response to both the modulation circuitry and the demodulation circuitry being in an idle state.

Example 2 is the transceiver device of example(s) 1, wherein the coupler is a capacitive coupler or an inductive coupler.

Example 3 is the transceiver device of example(s) 1, wherein the operating point is a preset level of voltage or charge.

Example 4 is the transceiver device of example(s) 1, wherein the compensator circuitry includes: a reference voltage source configured to provide the operating point; a blocking transistor network; a gate driver communicatively coupled to the blocking transistor network; and a digital control system configured to identify that the modulation circuitry and the demodulation circuitry are in the idle state and, in response to identifying that the modulation circuitry and the demodulation circuitry are in the idle state, output an enable signal through the gate driver to drive the blocking transistor network from a block state to a pass state to allow the operating point to be provided to the coupler to drive the coupler.

Example 5 is the transceiver device of example(s) 4, wherein the blocking transistor network includes MOSFET transistors.

Example 6 is the transceiver device of example(s) 1, wherein the transceiver device is positionable downhole in a wellbore and configured to communicate data via the DC power line bus with a second transceiver device positioned downhole in the wellbore.

Example 7 is the transceiver device of example(s) 1, further comprising: a digital processor to decode signals received from the power line bus and to encode signals to be transmitted on the power line bus.

Example 8 is a communication system comprising: a first transceiver device positionable in a wellbore for transmitting digital baseband data via a direct current (DC) power line bus in the wellbore; and a second transceiver device positionable in the wellbore and comprising: a coupler for the DC power line bus for transceiving data via the DC power line bus with the first transceiver device; modulation circuitry; demodulation circuitry; and compensator circuitry communicatively coupled to the coupler for providing an operating point to the coupler in response to both the modulation circuitry and the demodulation circuitry being in an idle state.

Example 9 is the communication system of example(s) 8, wherein the coupler is a capacitive coupler or an inductive coupler.

Example 10 is the communication system of example(s) 8, wherein the operating point is a preset level of voltage or charge.

Example 11 is the communication system of example(s) 8, wherein the compensator circuitry includes: a reference voltage source configured to provide the operating point; a blocking transistor network; a gate driver communicatively coupled to the blocking transistor network; and a digital control system configured to identify that the modulation circuitry and the demodulation circuitry are in the idle state and, in response to identifying that the modulation circuitry and the demodulation circuitry are in the idle state, output an enable signal through the gate driver to drive the blocking transistor network from a block state to a pass state to allow the operating point to be provided to the coupler to drive the coupler.

Example 12 is the communication system of example(s) 11, wherein the blocking transistor network includes MOSFET transistors.

Example 13 is the communication system of example(s) 8, wherein the first transceiver device and the second transceiver device are positionable downhole in a wellbore and are configured to communicate data via the DC power line bus downhole in the wellbore.

Example 14 is the communication system of example(s) 8, wherein the first transceiver device comprises: a first transceiver coupler for the DC power line bus for transceiving data via the DC power line bus with the second transceiver device; first transceiver modulation circuitry; first transceiver demodulation circuitry; and first transceiver compensator circuitry communicatively coupled to the first transceiver coupler for providing a first transceiver operating point to the first transceiver coupler in response to both the first transceiver modulation circuitry and the first transceiver demodulation circuitry being in the idle state.

Example 15 is a method, comprising: determining that a modulator and a demodulator of a transceiver positioned downhole are in an idle state, the transceiver having a coupler through which to transceive data with another transceiver downhole via a direct current (DC) power line bus; and in response to determining that the modulator and the demodulator are in the idle state, providing an operating point to the coupler.

Example 16 is the method of example(s) 15, wherein the coupler is a capacitive coupler or an inductive coupler.

Example 17 is the method of example(s) 15, wherein the operating point is a preset level of voltage or charge.

Example 18 is the method of example(s) 15, wherein providing an operating point to the coupler comprises: outputting an enable signal from a digital control system and via a gate driver to drive a blocking transistor network from a from a block state to a pass state to allow the operating point to be provided from a voltage source to the coupler to drive the coupler.

Example 19 is the method of example(s) 18, wherein the blocking transistor network includes MOSFET transistors.

Example 20 is the method of example(s) 15, further comprising: digitally decoding received and demodulated signals to determine data included in the signals received from the power line bus; and digitally encoding data to be modulated onto transmit signals that are transmitted onto the power line bus.

Example 21 is a transceiver device comprising: a coupler for a direct current (DC) power line bus for transceiving data via the DC power line bus; modulation circuitry; demodulation circuitry; and compensator circuitry communicatively coupled to the coupler for providing an operating point to the coupler in response to both the modulation circuitry and the demodulation circuitry being in an idle state.

Example 22 is the transceiver device of example(s) 21, wherein the coupler is a capacitive coupler or an inductive coupler.

Example 23 is the transceiver device of example(s) 21, wherein the operating point is a preset level of voltage or charge.

Example 24 is the transceiver device of example(s) 21, wherein the compensator circuitry includes: a reference voltage source configured to provide the operating point; a blocking transistor network; a gate driver communicatively coupled to the blocking transistor network; and a digital control system configured to identify that the modulation circuitry and the demodulation circuitry are in the idle state and, in response to identifying that the modulation circuitry and the demodulation circuitry are in the idle state, output an enable signal through the gate driver to drive the blocking transistor network from a block state to a pass state to allow the operating point to be provided to the coupler to drive the coupler.

Example 25 is the transceiver device of example(s) 24, wherein the blocking transistor network includes MOSFET transistors.

Example 26 is the transceiver device of example(s) 21, wherein the transceiver device is positionable downhole in a wellbore and configured to communicate data via the DC power line bus with a second transceiver device positioned downhole in the wellbore.

Example 27 is the transceiver device of example(s) 21, further comprising: a digital processor to decode signals received from the power line bus and to encode signals to be transmitted on the power line bus.

Example 28 is a communication system comprising: a second transceiver device; and the transceiver device of any of example(s)s 21 to 25 and 27.

Example 29 is the communication system of example(s) 28, wherein the transceiver device and the second transceiver device are positionable downhole in a wellbore and are configured to communicate data via the DC power line bus downhole in the wellbore.

Example 30 is a method, comprising: determining that a modulator and a demodulator of a transceiver positioned downhole are in an idle state, the transceiver having a coupler through which to transceive data with another transceiver downhole via a direct current (DC) power line bus; and in response to determining that the modulator and the demodulator are in the idle state, providing an operating point to the coupler.

Example 31 is the method of example(s) 30, wherein the coupler is a capacitive coupler or an inductive coupler.

Example 32 is the method of example(s) 30, wherein the operating point is a preset level of voltage or charge.

Example 33 is the method of example(s) 30, wherein providing an operating point to the coupler comprises: outputting an enable signal from a digital control system and via a gate driver to drive a blocking transistor network from a from a block state to a pass state to allow the operating point to be provided from a voltage source to the coupler to drive the coupler.

Example 34 is the method of example(s) 33, wherein the blocking transistor network includes MOSFET transistors.

Example 35 is the method of example(s) 30, further comprising: digitally decoding received and demodulated signals to determine data included in the signals received from the power line bus; and digitally encoding data to be modulated onto transmit signals that are transmitted onto the power line bus.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A transceiver device comprising:
   a coupler for a direct current (DC) power line bus for transceiving data via the DC power line bus;
   modulation circuitry;
   demodulation circuitry; and
   compensator circuitry communicatively coupled to the coupler for providing an operating point to the coupler in response to both the modulation circuitry and the demodulation circuitry being in an idle state.

2. The transceiver device of claim 1, wherein the coupler is a capacitive coupler or an inductive coupler.

3. The transceiver device of claim 1, wherein the operating point is a preset level of voltage or charge.

4. The transceiver device of claim 1, wherein the compensator circuitry includes:
   a reference voltage source configured to provide the operating point;
   a blocking transistor network;
   a gate driver communicatively coupled to the blocking transistor network; and
   a digital control system configured to identify that the modulation circuitry and the demodulation circuitry are in the idle state and, in response to identifying that the modulation circuitry and the demodulation circuitry are in the idle state, output an enable signal through the gate driver to drive the blocking transistor network from a block state to a pass state to allow the operating point to be provided to the coupler to drive the coupler.

5. The transceiver device of claim 4, wherein the blocking transistor network includes MOSFET transistors.

6. The transceiver device of claim 1, wherein the transceiver device is positionable downhole in a wellbore and configured to communicate data via the DC power line bus with a second transceiver device positioned downhole in the wellbore.

7. The transceiver device of claim 1, further comprising:
a digital processor to decode signals received from the power line bus and to encode signals to be transmitted on the power line bus.

8. A communication system comprising:
a first transceiver device positionable in a wellbore for transmitting digital baseband data via a direct current (DC) power line bus in the wellbore; and
a second transceiver device positionable in the wellbore and comprising:
a coupler for the DC power line bus for transceiving data via the DC power line bus with the first transceiver device;
modulation circuitry;
demodulation circuitry; and
compensator circuitry communicatively coupled to the coupler for providing an operating point to the coupler in response to both the modulation circuitry and the demodulation circuitry being in an idle state.

9. The communication system of claim 8, wherein the coupler is a capacitive coupler or an inductive coupler.

10. The communication system of claim 8, wherein the operating point is a preset level of voltage or charge.

11. The communication system of claim 8, wherein the compensator circuitry includes:
a reference voltage source configured to provide the operating point;
a blocking transistor network;
a gate driver communicatively coupled to the blocking transistor network; and
a digital control system configured to identify that the modulation circuitry and the demodulation circuitry are in the idle state and, in response to identifying that the modulation circuitry and the demodulation circuitry are in the idle state, output an enable signal through the gate driver to drive the blocking transistor network from a block state to a pass state to allow the operating point to be provided to the coupler to drive the coupler.

12. The communication system of claim 11, wherein the blocking transistor network includes MOSFET transistors.

13. The communication system of claim 8, wherein the first transceiver device and the second transceiver device are positionable downhole in a wellbore and are configured to communicate data via the DC power line bus downhole in the wellbore.

14. The communication system of claim 8, wherein the first transceiver device comprises:
a first transceiver coupler for the DC power line bus for transceiving data via the DC power line bus with the second transceiver device;
first transceiver modulation circuitry;
first transceiver demodulation circuitry; and
first transceiver compensator circuitry communicatively coupled to the first transceiver coupler for providing a first transceiver operating point to the first transceiver coupler in response to both the first transceiver modulation circuitry and the first transceiver demodulation circuitry being in the idle state.

15. A method, comprising:
determining that a modulator and a demodulator of a transceiver positioned downhole are in an idle state, the transceiver having a coupler through which to transceive data with another transceiver downhole via a direct current (DC) power line bus; and
in response to determining that the modulator and the demodulator are in the idle state, providing an operating point to the coupler.

16. The method of claim 15, wherein the coupler is a capacitive coupler or an inductive coupler.

17. The method of claim 15, wherein the operating point is a preset level of voltage or charge.

18. The method of claim 15, wherein providing an operating point to the coupler comprises:
outputting an enable signal from a digital control system and via a gate driver to drive a blocking transistor network from a from a block state to a pass state to allow the operating point to be provided from a voltage source to the coupler to drive the coupler.

19. The method of claim 18, wherein the blocking transistor network includes MOSFET transistors.

20. The method of claim 15, further comprising:
digitally decoding received and demodulated signals to determine data included in the signals received from the power line bus; and
digitally encoding data to be modulated onto transmit signals that are transmitted onto the power line bus.

* * * * *